(12) United States Patent
Nadgir

(10) Patent No.: US 8,910,186 B2
(45) Date of Patent: Dec. 9, 2014

(54) FEED-BASED PROMOTION OF SERVICE REGISTRY OBJECTS

(75) Inventor: Devaprasad K. Nadgir, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 178 days.

(21) Appl. No.: 13/296,292

(22) Filed: Nov. 15, 2011

(65) Prior Publication Data

US 2013/0125141 A1 May 16, 2013

(51) Int. Cl.
| | | |
|---|---|---|
| *G06F 3/00* | (2006.01) | |
| *G06F 9/44* | (2006.01) | |
| *G06F 9/46* | (2006.01) | |
| *G06F 13/00* | (2006.01) | |
| *H04L 29/08* | (2006.01) | |
| *G06F 9/54* | (2006.01) | |
| *G06F 11/30* | (2006.01) | |

(52) U.S. Cl.
CPC .......... *H04L 67/26* (2013.01); *G06F 11/3055* (2013.01); *G06F 11/302* (2013.01); *G06F 11/3068* (2013.01); *G06F 9/542* (2013.01)
USPC ........................................ 719/316

(58) Field of Classification Search
None
See application file for complete search history.

(56) References Cited

U.S. PATENT DOCUMENTS

| | | | |
|---|---|---|---|
| 7,904,480 B2 | 3/2011 | Palanisamy | |
| 7,921,154 B2 * | 4/2011 | Ballou | ............... 709/203 |
| 7,954,136 B2 * | 5/2011 | Fascenda | ................ 726/2 |
| 2006/0041558 A1 * | 2/2006 | McCauley et al. | ............. 707/10 |
| 2008/0301685 A1 | 12/2008 | Thomas et al. | |
| 2009/0150565 A1 * | 6/2009 | Grossner et al. | ............ 709/241 |
| 2009/0172021 A1 * | 7/2009 | Kane et al. | ............... 707/104.1 |
| 2009/0177708 A1 * | 7/2009 | Schinkelwitz | ............... 707/201 |
| 2009/0193096 A1 | 7/2009 | Boyer et al. | |
| 2010/0017368 A1 | 1/2010 | Mao et al. | |
| 2010/0049628 A1 | 2/2010 | Mannava et al. | |
| 2010/0057835 A1 | 3/2010 | Little | |
| 2011/0035650 A1 | 2/2011 | Jardine-Skinner et al. | |
| 2011/0047451 A1 | 2/2011 | Jardine-Skinner et al. | |
| 2011/0125800 A1 | 5/2011 | Seager et al. | |
| 2011/0167425 A1 * | 7/2011 | Lurie et al. | ................... 718/102 |
| 2012/0210335 A1 * | 8/2012 | Salt et al. | ..................... 719/315 |

OTHER PUBLICATIONS

Martin Treiber and Schahram Dustdar, Vienna University of Technology, "Active Web Service Registries", Engineering the Web Track, IEEE Computer Society, pp. 16-21, IEEE 2007.

(Continued)

*Primary Examiner* — Andy Ho
*Assistant Examiner* — William C Wood
(74) *Attorney, Agent, or Firm* — Thomas E. Lees, LLC

(57) ABSTRACT

An object is promoted by a governance domain, e.g., to a non-governance domain, by monitoring the object for a lifecycle state transition, publishing, using a processor, an alert as a feed if the monitored object transitions from one lifecycle state to another lifecycle state and exposing an application programming interface through which a production service registry obtains a copy of the monitored object. Correspondingly, a non-governance domain obtains an object through feed-based promotion by subscribing to a feed including information about lifecycle state transitions of an object of interest to the non-governance domain, where the feed is from a governance domain, monitoring the feed for alerts on the object transitioning lifecycle states, notifying a promotion handler on the non-governance domain that the object has transitioned lifecycle states and obtaining the object from the governance domain.

20 Claims, 5 Drawing Sheets

(56) References Cited

OTHER PUBLICATIONS

Jack D. Herrington, Leverage Software Inc., "AJAX RSS READER", http://www.ibm.com/developerworks/library/x-ajaxrss/, May 12, 2006.

AJAX (programming), http://en.wikipedia.org/wiki/Ajax_(programming); downloaded on Sep. 12, 2011.

Application Programming Interface, http://en.wikipedia.org/wiki/Api, downloaded on Aug. 25, 2011.

IBM Corporation, WebSphere Service Registry and Repository, "Promotion", http://publib.boulder.ibm.com/infocenter/sr/v7r0/topic/com.ibm.sr.doc/cwsr_promotion.html, last updated Jun. 6, 2011.

RSS, http://en.wikipedia.org/wiki/RSS, downloaded on Aug. 25, 2011.

Uniform Resource Identifier, http://en.wikipedia.org/wiki/Uniform_Resource_Identifier, downloaded on Sep. 12, 2011.

* cited by examiner

FEED-BASED PROMOTION OF SERVICE REGISTRY OBJECTS

BACKGROUND

Various aspects of the present invention relate generally to the promotion of service registry objects and in particular to the promotion of service registry objects in an enterprise architecture.

In a service oriented architecture, a software enterprise service bus (ESB) is used to facilitate communication between different domains on the bus. Each domain on an ESB usually includes a service registry. The main function of the service registry is to act as a repository for data such as the associated domain's service-related data and descriptions of the domain's service-related data. For instance, the service registry can be used to store the physical documents or objects related to the description of a service (e.g., service endpoint objects).

A governance service registry (e.g., WebSphere Service Registry and Repository by International Business Machines Corp.) on a governance domain stores an object and associates the object with a governance lifecycle, which includes various states. When the object reaches a certain state in its lifecycle, the object is promoted from the governance service registry to a production service registry in a production environment.

For example, a service endpoint object stores information about a simple object access protocol (SOAP) endpoint address of a web service definition language (WSDL) service in a governance service registry. When the WSDL service transitions to a lifecycle state "Approved for Production," the SOAP endpoint is promoted to a production service registry.

BRIEF SUMMARY

According to aspects of the present invention, a method for promoting an object by a governance domain is provided. The method monitors the object for a lifecycle state transition. If the monitored object transitions from one lifecycle state to another lifecycle state, then the method publishes an alert as a feed. Further, the method exposes an application programming interface (API) through which a production service registry obtains a copy of the monitored object, e.g., through information stored in the feed.

According to further aspects of the present invention, a method of obtaining an object using feed-based promotion is provided. The method subscribes to a feed that is published by a governance domain where the feed includes information about lifecycle state transitions of an object of interest. The method monitors the feed for alerts on the object transitioning lifecycle states and notifies a promotion handler that the object has transitioned lifecycle states. When notified, the production handler obtains the object from the governance domain.

DETAILED DESCRIPTION

Figure 1:
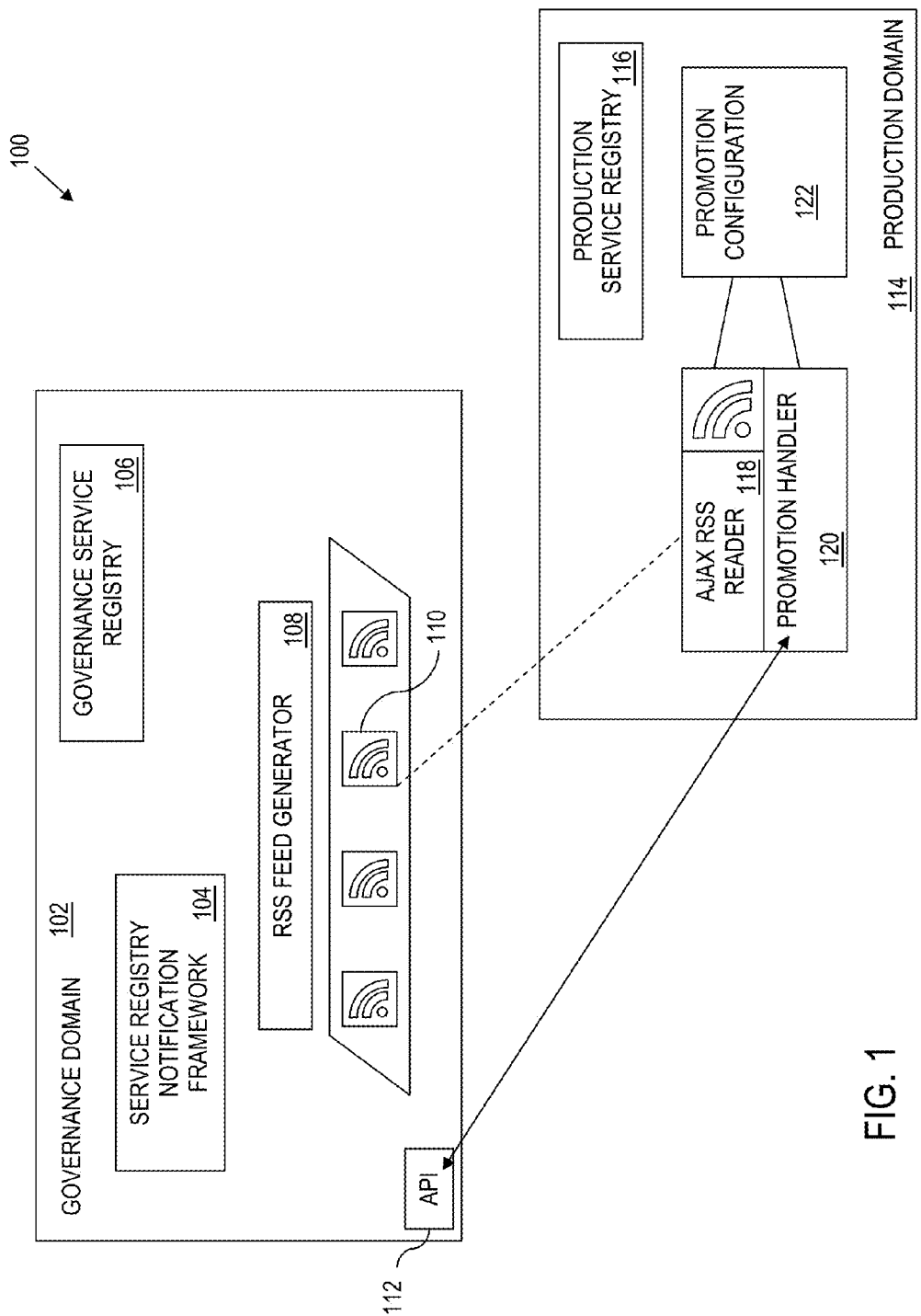
FIG. 1 is a block diagram illustrating feed-based promotion of an object, according to aspects of the present invention.

Aspects of the present invention implement feed-based promotion of service registry objects, as specifically described below with reference to the accompanying drawings. In this manner, aspects of the present invention can be carried out in a variety of different modes and should not be limited to the content of description of any particular embodiment.

According to aspects of the present invention, active feeds are used to facilitate the promotion of governed service registry objects from a governance domain to service registries of other (non-governance) domains.

As used herein, the term "governance domain" includes a domain that publishes news feeds or "feeds" about lifecycle transitions of objects maintained in a service registry of that domain.

As used herein, the term "non-governance domain" is used broadly to include a domain that is not a governance domain. Non-governance domains can subscribe to the feed(s) published by the governance domain to learn of lifecycle transitions of objects of interest, as will be described in greater detail herein. Examples of a non-governance domain include a production/runtime domain, a staging domain, a testing domain, a cross service registry domain, etc. Moreover, the term "non-governance domain" includes relative higher and lower level domains in a domain hierarchy. For instance, in an enterprise architecture, there may be multiple runtime domains, such as an eBusiness domain, a retail domain, a sales domain, a customer relationship management domain, etc., each of which define an instance of a non-governance domain.

In an illustrative implementation, a governance domain (also called a development domain) includes a feed generator such as a really simple syndication (RSS) feed generator that publishes an active feed of governance activity. For instance, the RSS feed generator publishes an active feed when a governance object in the corresponding governance service registry has reached a specific governance lifecycle stage.

Each non-governance domain includes a corresponding reader, e.g., an RSS feed reader, which subscribes to one or more feeds from the RSS feed generator of the governance domain. As such, the non-governance domains obtain information about service registry objects, including lifecycle state transitions, from reading the feeds published by the governance domain. In response to obtaining information about a lifecycle state transition of an object of interest, a corresponding non-governance domain can fetch that object, e.g., by cloning the object of interest from the service registry of the governance domain.

As an exemplary implementation, the feed generator works with an application programming interface (API) based notification framework to provide notifications of governance state transitions on an RSS feed. Correspondingly, an RSS reader associated with a non-governance domain monitors the RSS feed published on the governance service registry, e.g., using AJAX (asynchronous JavaScript and XML (extensible markup language)) technology. AJAX (or other suitable technology) is also utilized to notify a promotion handler of the non-governance domain to obtain a copy of an object of interest in response to information obtained from the feed. The promotion handler retrieves (e.g., pulls) the object using the API exposed by the governance domain, e.g., through information stored in the associated feed.

Referring now to the drawings and in particular to FIG. 1, a system 100 for implementing feed-based promotion of service registry objects is depicted. As illustrated, a governance domain 102 includes an API-based notification framework 104, a governance domain service registry 106, a feed generator 108, at least one feed 110 and an API 112. The governance domain service registry 106 creates objects (e.g., service endpoint objects) and associates each created object with a governance lifecycle. This lifecycle goes through various states.

The API-based notification framework 104 monitors the objects within the governance domain service registry 106 for lifecycle state transitions. When the notification framework 104 detects a lifecycle state transition on one of the objects within the governance domain service registry 106, the notification framework 104 notifies the feed generator 108 of the state transition. In response, the feed generator 108 publishes the transition on a feed 110. By way of illustration, the feed generator 108 determines if the state transition is a relevant lifecycle state transition (e.g., a transition to "Approved for Production"), and if so, then the feed generator 108 publishes the transition on a corresponding feed 110. The governance domain 102 also exposes an API 112 for non-governance domains to retrieve the object.

In certain illustrative implementations, the feed generator 108 is implemented as a component of the governance domain service registry 106 to generate feeds that represent the governance activity of all types of objects in the governance domain service registry 106. Regardless of implementation however, the type of feed generator 108 determines the type of feed 110 published. For example, an RSS feed generator 108 generates an RSS feed 110, and an Atom feed generator 108 generates an Atom feed 110. Moreover, the generated feeds 110 can reflect any type of hierarchy. For example, the feed 110 can be dedicated to specific objects, specific object types, etc., in the governance domain service registry 106. As another example, the feed 110 can be dedicated to a specific non-governance domain or specific group of non-governance domains. In a further example, the feed 110 can be dedicated to a combination of the previous examples.

The system 100 also includes at least one non-governance domain. For purposes of clarity of discussion, a single non-governance domain 114 is illustrated. However, in practice, the system 100 may include a plurality of non-governance domains, e.g., domains that represent different test, staging or production environments, for instance.

As illustrated, the non-governance domain 114 includes a production service registry 116 for storing objects associated with the non-governance domain 114, a reader 118, a promotion handler 120 and a promotion configuration module 122.

The feed reader 118 monitors the feeds 110 generated on the governance domain 102 for published updates on lifecycle state transitions of objects of interest. Objects of interest may include for example, objects stored in the production service registry 116 and/or the promotion configuration module 122. For instance, when the feed reader 118 detects a published transition of an object that is of interest to the non-governance domain 114, the feed reader 118 notifies the promotion handler 120 within the non-governance domain 114, and the promotion handler 120 retrieves the object of interest using the API 112 exposed in the governance domain 102.

In this regard, the object of interest is effectively "promoted" from the governance domain service registry 106 of the governance domain 102 to the service registry 116 of the non-governance domain 114 in response to reaching a specific state in the governance lifecycle. As an example, a full set or a sub-set of the object (along with the object's properties and relationships) is copied from the governance domain service registry 106 to the service registry 116 of the non-governance domain 114.

The type of feed reader 118 should be complementary with the type of feed 110 generated by the feed generator 108. For example, an RSS feed reader 118 should be coupled with an RSS feed generator 108, and an Atom feed reader 118 should be coupled with an Atom feed generator 108. Further, in exemplary embodiments, the feed reader 118 includes an AJAX-based interface, which allows for the feed reader 118 to "asynchronously" monitor the feed 110 published by the governance domain 102. In such embodiments, the feed 110 should be able to respond to AJAX-style monitoring.

The promotion handler 120 retrieves the object by making a copy (i.e., a clone) of the object and storing the copy in the production service registry 116. In certain embodiments, the promotion handler 120 schedules the retrieval of an object for a time during low server activity.

In illustrative implementations, the feed reader 118 and the promotion handler 120 use a pre-defined promotion configuration module 122 that stores information, which may include governance domain details such as the governance service registry universal resource locator (URL), connection details, certificate stores, a target governance model, timer configurations to enable reading/promotion tasks during low server activity, interested service registry syndications, such as xpath configurations to monitor a specific type of object identified by its classifications, etc.

As an illustration, information that may be included in the promotion configuration module 122 includes xpath configurations to define a specific type of object that should be monitored for use in the non-governance domain 114. For example, an eBusiness domain production service registry 116 may be interested in service registry objects of type SOAP (simple object access protocol) endpoint including a classification of "http://jkenterprises.com/classifications#eBusiness" applied to the SOAP endpoints. In such an example, the classification xpath is included in the promotion configuration module 122, and the feed reader 118 only monitors feeds 110 with eBusiness SOAP endpoints, unless other types of objects, which are defined in the promotion configuration 122, are also of interest to the eBusiness domain (non-governance domain 114). Thus, various aspects of the present invention enable domain-specific users to configure and govern the type of service registry objects from the governance domain 102 that the production service registry 116 needs.

Further, in embodiments that allow the feed reader 118, the promotion handler 120, or both to schedule their respective activities for times during low server activity, the promotion configuration 122 may include timers and timer configurations for scheduling of those activities. Thus, various aspects of the present invention enable the ability to schedule monitoring feeds, schedule the retrieval of objects to the non-governance domain 114, or both, during times of low server activity.

Moreover, various aspects of the present invention allow production service registries 116 to "pull" relevant information from a governance domain service registry 106 based on the non-governance domain's interest in the objects. This arrangement avoids the need to have all of the objects "pushed" to the appropriate non-governance domain by the governance domain 102.

Figure 2:
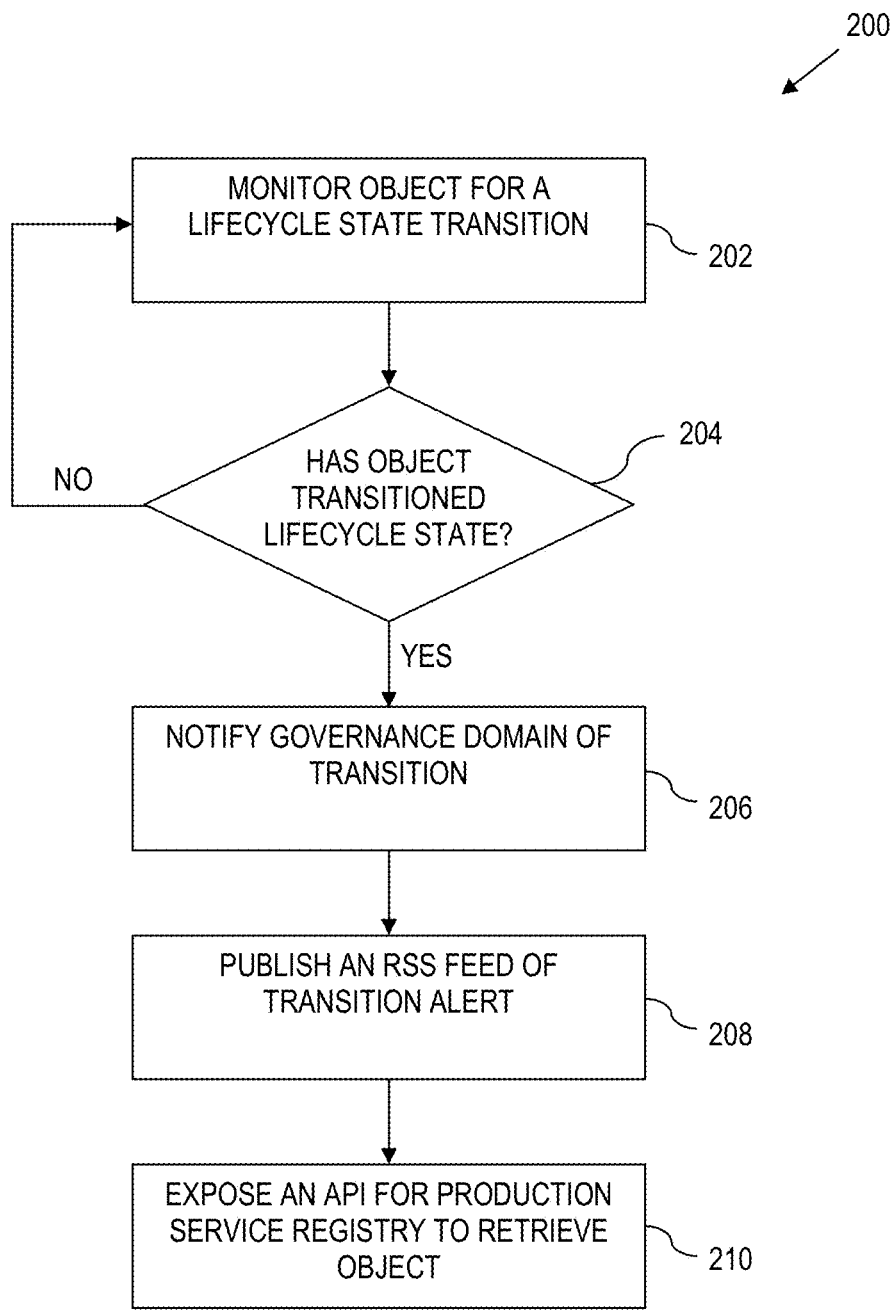
FIG. 2 is a flow chart illustrating feed-based promotion of an object from the vantage point of a governance domain, according to aspects of the present invention.

FIG. 2 illustrates a method 200 for promoting an object by a governance domain, and/or for implementing various other aspects of the present invention, such as described above in reference to the governance domain (102, FIG. 1). The method 200 may be implemented, for instance, as executable program code, e.g., stored on a computer-readable storage device, where the program instructs a processor to perform the method 200. The method may also be implemented by a computer system having a processor coupled to memory, where the memory has executable program code stored thereon, and the executable program code instructs the processor to perform the method 200.

The method 200 comprises monitoring objects at 202 for a lifecycle state transition, such as from one lifecycle state to another lifecycle state. For instance, in an illustrative implementation, an existing API and notification framework are used to monitor objects within a governance service registry for lifecycle state transitions. In this regard, the API can be utilized, for instance, to notify the governance domain that the object has transitioned from one lifecycle state to another lifecycle state.

The method further comprises publishing an alert as a feed if the monitored object transitions from one lifecycle state to another lifecycle state. For instance, At 204, if an object transitions from one lifecycle state to another lifecycle state, then the governance domain is notified of the transition at 206. However, if no objects transition lifecycle state, then the objects continue to be monitored at 202. After the governance domain is notified of a transition at 206, the feed generator publishes the transition of the object as a feed at 208. As mentioned above, the feed may be an RSS feed, an Atom feed, or any other type of feed.

The method 200 further comprises exposing an API such that a production service registry of an associated non-governance domain can obtain a copy of a monitored object at 210. For instance, in an illustrative implementation, in response to reading a feed indicating a lifecycle state transition of an object of interest, the handler of an associated non-governance domain uses the API to request a copy of the object of interest, which is identified to the governance domain based upon information extracted from the feed. In response to receiving the request, the governance domain sends a copy of the object to the production service registry of the non-governance domain. In this regard, sending the copy of the monitored object of interest can occur independent of security settings on any other production service registries coupled to the governance domain.

An example XML code snippet for a service registry feed is shown below, where the classification and governance state is represented through example uniform resource identifiers (URIs).

```
<?xml version="1.0" encoding="UTF-8" ?>
<rss version="2.0">
<channel>
<title>Service Registry Governance Update</title>
<description>Example feed to notify the production service registries of governance transitions.</description>
<lastBuildDate>Mon, 28 Aug 2010 11:12:55 -0400 </lastBuildDate>
<pubDate>Tue, 29 Aug 2010 09:00:00 -0400</pubDate>
<item>
<title>SOAP Endpoint AccountOpeningServiceEndpoint transition to "Approved_For_Production" state. </title>
<description>AccountOpeningServiceEndpoint with classification URIs http://jkenterprises/classifications/CRMDomainEndpoint, http://jkenterprises/classifications/ProductionEntpoint transitioned to state http://jkenterprises/governancemodel#ApproveForProduction.
</description>
<link> https://governnaregistry:port/ServiceRegistry/ViewDetail.do?uri=33aacf33-09ec-4c89.be7b.85a2e9857bad
</link>
<guid isPermaLink="false"> 33aacf33-09ec-4c89.be7b.85a2e9857bad
</guid>
<pubDate>Tue, 29 Aug 2010 09:00:00 -0400</pubDate>
</item>
</channel>
</rss>
```

Although pictured as a serial flow, the method 200 may be implemented in parallel such that monitoring for transitions 202 and detecting a transition 204 may be performed in parallel with notifying the governance domain of the transition 206 and publishing the transition as a feed 208. Further, exposing the API 210 may be performed at any time, in parallel with the other functions of the method 200, or both.

Figure 3:
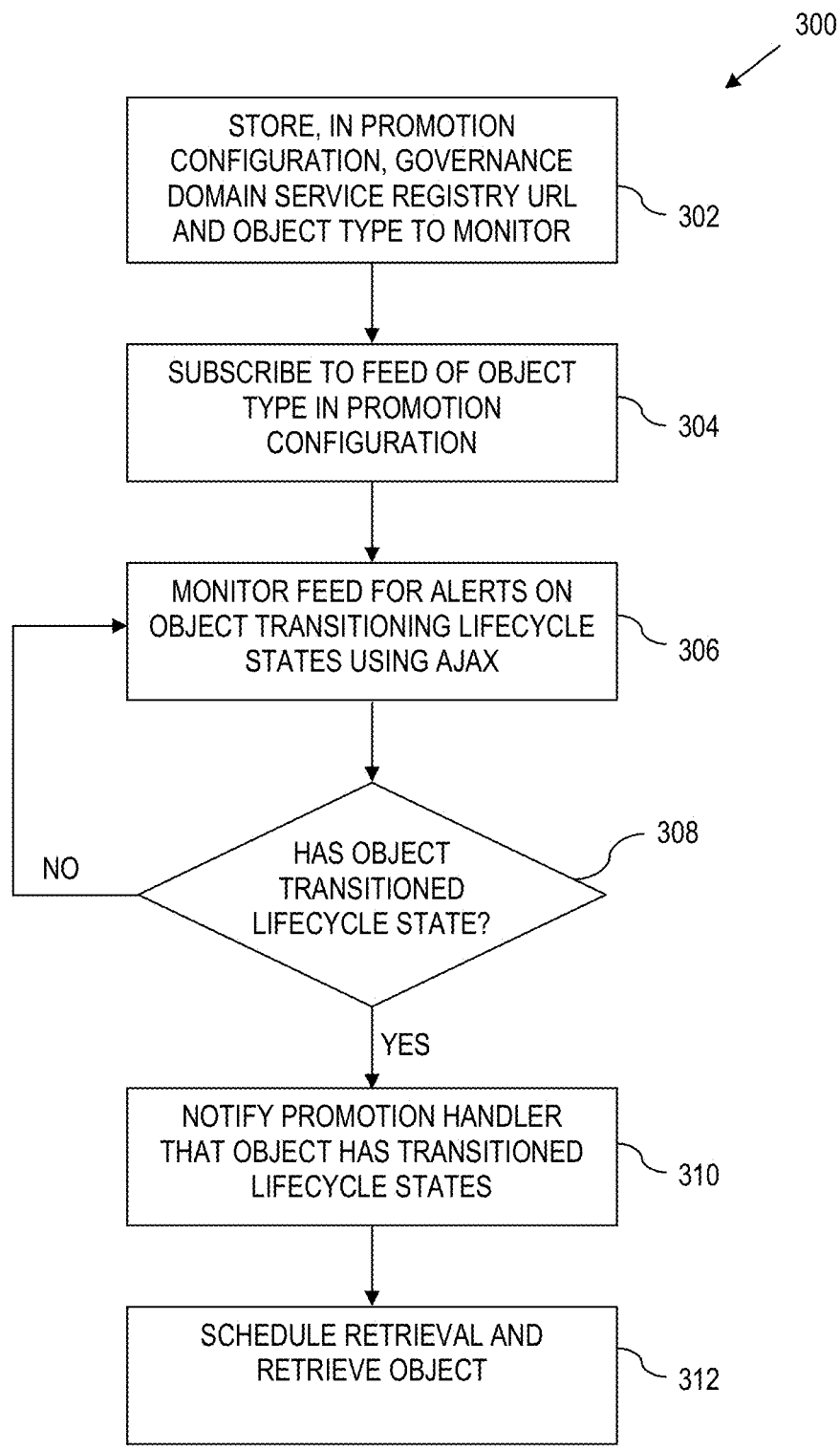
FIG. 3 is a flow chart illustrating feed-based promotion of an object from the vantage point of a non-governance domain, according to aspects of the present invention.

FIG. 3 illustrates a method 300 of obtaining an object using feed-based promotion and/or for implementing various aspects of the present invention described above in reference to the non-governance domain (114, FIG. 1). The method 300 may be implemented, for instance, as executable program code, e.g., stored on a computer-readable storage device, where the program instructs a processor to perform the method 300. The method may also be implemented by a computer system having a processor coupled to memory, where the memory has executable program code stored thereon, and the executable program code instructs the processor to perform the method 300.

At 302, a user stores pre-determined information including a specific type of object to monitor and the URL of the governance domain in the promotion configuration. The method 300 also comprises subscribing, at 304, to a feed including information about lifecycle state transitions of an object of interest to the non-governance domain, where the feed is from a governance domain. As an example, at 304, the non-governance domain subscribes to the governance feeds concerning the objects of the type that are listed in the promotion configuration.

At 306, the feed is monitored for alerts on the object transitioning lifecycle states. As an illustration, at 306, the feed reader monitors the feed for published alerts concerning lifecycle state transitions of the objects, such as by polling the governance domain for transitions in the lifecycle state of the object. As mentioned above, the feed reader can read the feeds asynchronously using AJAX. Moreover, as noted in greater detail herein, the type of feed reader should be complementary to the type of feed generated. At 308, if no alerts are published, then the non-governance domain continues to monitor the feed. If an alert is published, then the feed reader notifies the promotion handler on the non-governance domain at 310 that an object of interest has transitioned lifecycle states.

At 312, the object is retrieved from the governance domain. For instance, at 312, the promotion handler schedules a retrieval process that retrieves the object of interest. As mentioned above, the retrieval of the object includes creating a copy of the object on the production service registry. Further, the retrieval can be scheduled for immediate retrieval or at some time in the future, such as a time of low server activity.

By way of illustration, a retrieval request can be scheduled for a time that the governance domain has historically low server activity.

The method 300 may also optionally include storing, in a promotion configuration, a governance domain service registry URL. In this regard, monitoring the feed for alerts can be implemented by using the domain service registry URL to monitor the feed. The method 300 may also and/or alternatively include, storing, in a promotion configuration, identification of a specific type of object. In this regard, subscribing to a feed can be based, at least in part, on the identification of a specific type of object.

Figure 4:
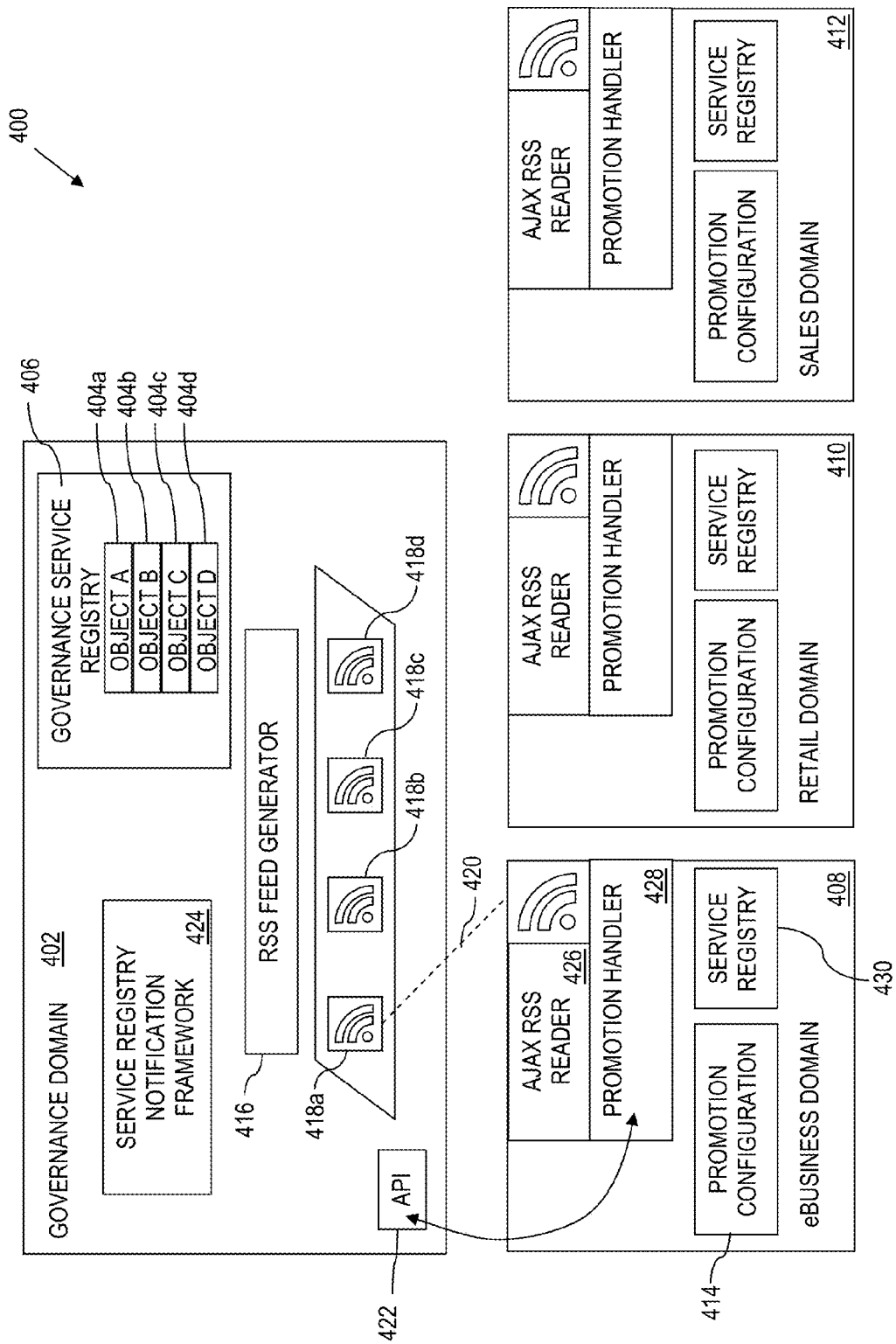
FIG. 4 is a block diagram illustrating an example of feed-based promotion of an object in a system with a governance domain and several non-governance domains, according to aspects of the present invention.

FIG. 4 shows a non-limiting example illustrating various aspects of the present invention by showing an exemplary enterprise service bus (ESB) system of a corporation. The system 400 includes a governance domain 402 similar to the governance domain 102 in FIG. 1 and has several objects 404a-d within its service registry 406. Within the ESB system 400 are several non-governance domains managed by different departments: an eBusiness domain 408, a retail domain 410, and a sales domain 412. Each non-governance domain 408, 410, 412 includes similar components, but has different security mechanisms from the other non-governance domains 408, 410, 412.

Within a promotion configuration 414 space in the eBusiness domain 408 is a classification xpath similar to the one listed above in reference to FIG. 1, http://jkenterprises.com/classifications#eBusiness." Thus, the eBusiness domain 408 is interested in SOAP endpoint objects with a type of eBusiness, and object A 404a is a SOAP endpoint object with a type of eBusiness. Therefore, the eBusiness domain 408 is interested in object A 404a. The other non-governance domains 410, 412 do not include that xpath, so the other non-governance domains 410, 412 are not interested in object A 404a.

The exemplary RSS feed generator 416 on the governance domain 402 generates RSS feeds 418a-d for the objects 404a-d in the governance service registry 406. For instance, each feed 418 can correspond to an associated object 404. Other combinations and groupings may also be implemented. Keeping with the current example, the eBusiness domain 408 subscribes to the RSS feed 418a for object A 404a to monitor for transitions on object A 404a by periodically polling the feed 418a. Such polling may be done with a short period, a longer period, or scheduled at times of low server activity as mentioned above. The governance domain 402 also exposes an API 422 so the eBusiness domain 408 can retrieve object A 404a when needed.

When object A 404a transitions from an "Approved for Management" lifecycle state to an "Approved for Production" lifecycle state, the notification framework 424 on the governance domain 402 notifies the RSS feed generator 416 that a transition has taken place, and the RSS feed generator 416 publishes an alert on the RSS feed 418a associated with object A 404a that a transition has taken place.

The RSS reader 426, which has been asynchronously monitoring the feed 418a using AJAX, receives the alert published by the governance domain 402 and notifies the promotion handler 428 of the transition. The promotion handler 428 schedules a retrieval of object A 404a and when the time comes, accesses object A 404a thought the exposed API 422 on the governance domain and copies object A 404a to the eBusiness service registry 430. The other non-governance domains 410, 412 do not monitor the feed 418a for object A 404a, so those non-governance domains 410, 412 do not retrieve object A 404a.

Notably, different domains have their own security and compliance requirements. For instance, an e-Business domain may not work with the same security settings as that of the governance domain in which the governance service registry resides. With the pulling approaches of promoting an object as described more fully herein, the only security mechanism that has to be negotiated for the promotion of object A 404a is the security mechanism between the governance domain 402 and the eBusiness domain 408. Comparatively, a pushing method of promoting an object would require that the governance domain 402 negotiate security mechanisms with all of the non-governance domains 408, 410, 412 because object A 404a would be pushed to every non-governance domain 408, 410, 412 in the ESB architecture. Still further, the pushing method of promotion could become too complicated to be effectively handled by a single governance service registry because, for instance, configurations can be error prone and typically are not entertained to be changed very frequently.

According to aspects of the present invention, a framework is provided that is suitable for an evolving enterprise infrastructure, where runtime service registries "pull" relevant information from the governance service registry domain based on the 'intent' or 'interest' defined by them through classifications. Accordingly, a reduction in the duplication of various service registry objects in runtime service registries is achieved. Moreover, the task of managing governed records in sensitive production environments is achieved.

In particular, active feeds are used to represent the governance lifecycle activity of objects stored in governance service registry, and to achieve promotion of governed service registry objects in the governance domain to production/runtime service registries of other domains. The runtime/production service registry is enhanced with a "Feed Listener" or a "Feed Client", which gets an alert by a "feed daemon" to notify the runtime registry of a service registry object reaching a specific governance state. This alert activity fetches the service registry object through a promotion driven by the governance service registry to its runtime service registry, e.g., from the governance registry to its runtime footprint by creating a clone of the original service registry object.

Still further, according to aspects of the present invention, in an enterprise architecture, where there are multiple domains with individual runtime/production service registries, promotion is achieved by a "pull" mode, where a predefined configuration of the feed client lets the production service registry take action on only service registry objects that is of interest to the domain. For example, an eBusiness Domain production service registry fetches and/or synchronizes the service registry objects of type SOAP Endpoint, with a classification of "http://jkenterprises.com/classifications#eBusiness" applied to it. This method enables domain specific users (e.g., eBusiness, Retail, Customer Relationship Management (CRM), Sales, etc.,) to configure and govern the type of service registry objects that their domain production service registry needs.

The arrangements herein further avoid the need to duplicate objects across different service registries in different domains, where certain service registries may not even need the objects promoted by the governance service registry. Notably, according to aspects of the present invention, the production service registry takes action on only service registry objects that is/are of interest to the domain. Correspondingly, in a "push" model of promotions, promotion targets are bound to receiving objects that the mediation module may not even use.

Still further, as noted in greater detail herein, the fetch/synchronization of objects to the production environment can be scheduled during low end activity of the domain ESB/

Connectivity Provider infrastructure. Moreover, individual security settings of the production/runtime service registry need not be available to the governance service registry, providing a more secure environment for production services infrastructures.

According to various aspects of the present invention, publish initiation is triggered through a lifecycle transition. For example, when the governance state of an endpoint reaches an "Online" governance state, an RSS feed (or similar feed) is published in the governance registry for target runtime domains to pull the endpoint related objects (like policies, endpoint URL, etc) into its runtime registry. As such, a target specific runtime registry can pull "just" the information that it needs to update its registry contents, thus providing performance related through the de-coupling of governance to runtime registry domains.

Figure 5:
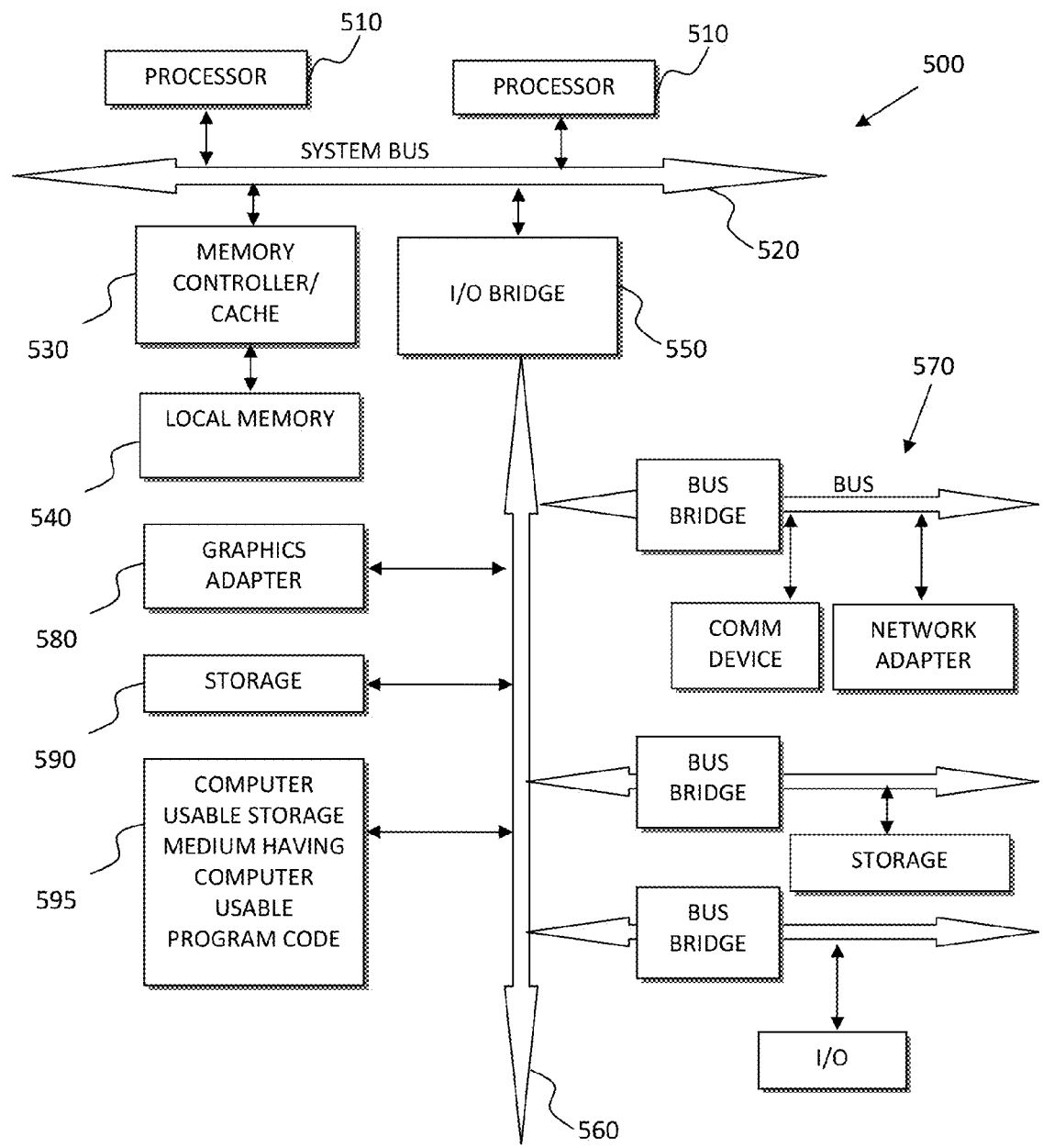
FIG. 5 is a block diagram of a computer system having a computer readable storage device for implementing functions according to various aspects of the present invention as described in greater detail herein.

Referring to FIG. 5, a block diagram of a data processing system is depicted in accordance with the present invention. Data processing system 500 may comprise a symmetric multiprocessor (SMP) system or other configuration including a plurality of processors 510 connected to system bus 520. Alternatively, a single processor 510 may be employed. Also connected to system bus 520 is memory controller/cache 530, which provides an interface to local memory 540. An I/O bus bridge 550 is connected to the system bus 520 and provides an interface to an I/O bus 560. The I/O bus may be utilized to support one or more buses and corresponding devices 570, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 580, storage 590 and a computer usable storage medium 595 having computer usable program code embodied thereon. The computer usable program code is executed to implement any aspect of the present invention, for example, to implement any aspect of any of the methods and/or system components illustrated in FIGS. 1-4. Moreover, the computer usable program code may be utilized to implement any other processes that are associated with transferring objects, inter-heap communication, or other aspects as set out further herein.

The data processing system depicted in FIG. 5 may comprise, for example, an IBM RS/6000 system, a product of International Business Machines Corporation in Armonk, N.Y., running the Advanced Interactive Executive (AIX) operating system. An object oriented programming system such as Java may run in conjunction with the operating system and provides calls to the operating system from Java programs or applications executing on data processing system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Aspects of the invention were chosen and described in order to best explain the principles of the invention and the practical application, and to enable others of ordinary skill in the art to understand the invention for various embodiments with various modifications as are suited to the particular use contemplated.

What is claimed is:

1. A method for implementing feed-based promotion of objects, the method comprising:
    associating an object maintained in a service registry of a governance domain with a governance lifecycle, where the governance lifecycle transitions through states;
    associating the object with at least one feed maintained by the governance domain;
    monitoring the object for a lifecycle state transition;
    determining whether a detected lifecycle state transition is relevant to a corresponding feed subscribed-to by a non-governance domain;
    publishing an alert on the corresponding feed if the monitored object transitions from one lifecycle state to another lifecycle state and the detected lifecycle state transition is relevant to the corresponding feed; and
    exposing an application programming interface through which a production service registry of a non-governance domain pulls a copy of the monitored object in response to the alert.

2. The method of claim 1, wherein monitoring the object further includes using the application programming interface to notify the governance domain that the object has transitioned from one lifecycle state to another lifecycle state.

3. The method of claim 1, wherein publishing the alert further includes using a really simple syndication (RSS) feed generator to publish the feed as an RSS feed.

4. The method of claim 1 further including sending the copy of the monitored object to the production service registry upon a request for retrieval from the production service registry, wherein sending the copy is independent of security settings on any other production service registries coupled to the governance domain.

5. A method of obtaining an object using feed-based promotion, the method comprising:
    subscribing to a feed including information about lifecycle state transitions of an object of interest to a non-governance domain, wherein the feed is from a governance domain and the governance domain determines whether a detected lifecycle state transition is relevant to the non-governance domain;
    monitoring the feed for alerts on the object transitioning lifecycle states;
    notifying a promotion handler on the non-governance domain that the object has transitioned lifecycle states and is of interest to the non-governance domain; and
    pulling the object from the governance domain in response to the alert.

6. The method of claim 5, wherein monitoring the feed further includes asynchronously monitoring the feed using asynchronous JavaScript and extensible markup language (AJAX).

7. The method of claim 6, wherein monitoring the feed further includes polling the governance domain for transitions in the lifecycle state of the object.

8. The method of claim 5, wherein obtaining the object further includes scheduling a retrieval request for a time that the governance domain has historically low server activity.

9. The method of claim 5 further including storing, in a promotion configuration, a governance domain service registry universal resource locator;
    wherein monitoring the feed for alerts further includes using the governance domain service registry universal resource locator to monitor the feed.

10. The method of claim 5 further including:
    storing, in a promotion configuration, identification of a specific type of object;
    wherein subscribing to the feed is based at least in part on an identification of the specific type of object.

11. A computer-readable storage device with an executable program for promoting an object by a governance domain stored thereon, wherein the program instructs a processor to perform:
   associating an object maintained in a service registry of a governance domain with a governance lifecycle, where the governance lifecycle transitions through states;
   associating the object with at least one feed maintained by the governance domain;
   monitoring the object for a lifecycle state transition;
   determining whether a detected lifecycle state transition is relevant to a corresponding feed subscribed-to by a non-governance domain;
   publishing an alert on the corresponding feed if the monitored object transitions from one lifecycle state to another lifecycle state and the detected lifecycle state transition is relevant to the corresponding feed; and
   exposing an application programming interface through which a production service registry of a non-governance domain pulls a copy of the monitored object in response to the alert.

12. The computer-readable storage device of claim 11, wherein monitoring the object further includes using the application programming interface to notify the governance domain that the object has transitioned from one lifecycle state to another lifecycle state.

13. The computer-readable storage device of claim 11, wherein publishing the alert further includes using a really simple syndication (RSS) generator feed to publish the feed as an RSS feed.

14. The computer-readable storage device of claim 11, wherein the program further instructs the processor to perform: sending the copy of the monitored object to the production service registry upon a request for retrieval from the production service registry, wherein the sending is independent of security settings on any other production service registries coupled to the governance domain.

15. A computer-readable storage device with an executable program for obtaining an object using feed-based promotion stored thereon, wherein the program instructs a processor to perform:
   subscribing to a feed including information about lifecycle state transitions of an object of interest to a non-governance domain, wherein the feed is from a governance domain and the governance domain determines whether a detected lifecycle state transition is relevant to the non-governance domain;
   monitoring the feed for alerts on the object transitioning lifecycle states;
   notifying a promotion handler on the non-governance domain that the object has transitioned lifecycle states and is of interest to the non-governance domain; and
   pulling the object from the governance domain in response to the alert.

16. The computer-readable storage device of claim 15, wherein monitoring the feed further includes asynchronously monitoring the feed using asynchronous JavaScript and extensible markup language (AJAX).

17. The computer-readable storage device of claim 16, wherein monitoring the feed further includes polling the governance domain for transitions in the lifecycle state of the object.

18. The computer-readable storage device of claim 15, wherein obtaining the object further includes scheduling a retrieval request for a time that the governance domain has historically low server activity.

19. The computer-readable storage device of claim 15, wherein the program further instructs the processor to perform:
   storing, in a promotion configuration, a governance domain service registry universal resource locator; wherein
   monitoring the feed for alerts further includes using the governance domain service registry universal resource locator to monitor the feed.

20. The computer-readable storage device of claim 15, wherein the program further instructs the processor to perform: storing, in a promotion configuration, identification of a specific type of object; wherein subscribing to a feed is based at least in part on the identification of a specific type of object.

* * * * *